United States Patent [19]

Minnett et al.

[11] 4,186,398

[45] Jan. 29, 1980

[54] MODULATION OF SCANNING RADIO BEAMS

[75] Inventors: Harry C. Minnett, Castle Cove; Brian F. C. Cooper, Turramurra, both of Australia

[73] Assignee: Commonwealth Scientific and Industrial Research Organization, Campbell, Australia

[21] Appl. No.: 891,359

[22] Filed: Mar. 29, 1978

Related U.S. Application Data

[63] Continuation-in-part of Ser. No. 694,126, Jun. 8, 1976, abandoned.

[30] Foreign Application Priority Data

Jun. 9, 1975 [AU] Australia .................... PC1919

[51] Int. Cl.[2] .................... G01S 1/16; G01S 1/54

[52] U.S. Cl. .................... 343/100 SA; 343/108 M; 343/854

[58] Field of Search .................... 343/108 M, 854, 100 SA

[56] References Cited

U.S. PATENT DOCUMENTS

| | | | |
|---|---|---|---|
| 2,466,354 | 4/1949 | Bagnall | 343/854 |
| 2,896,189 | 7/1959 | Wiggins | 343/854 |
| 3,140,490 | 7/1964 | Sichak et al. | 343/854 |
| 3,670,335 | 6/1972 | Hirsch | 343/854 |
| 3,787,861 | 1/1974 | Becavin et al. | 343/108 M |
| 3,878,523 | 4/1975 | Wild | 343/108 M |
| 3,993,999 | 11/1976 | Hemmi et al. | 343/100 SA |
| 4,090,199 | 5/1978 | Archer | 343/100 SA |

*Primary Examiner*—Maynard R. Wilbur
*Assistant Examiner*—Richard E. Berger
*Attorney, Agent, or Firm*—Sughrue, Rothwell, Mion, Zinn and Macpeak

[57] ABSTRACT

Complex modulation—that is, amplitude and phase modulation—is used to provide smaller beamwidth and better angular resolution of a scanning radio beam generated by a commutatively switched aerial. The way in which the modulation pattern may be determined is detailed, and examples are given of the application of complex modulation techniques to different types of commutative aerials.

7 Claims, 24 Drawing Figures

MODULATION OF SCANNING RADIO BEAMS

BACKGROUND OF THE INVENTION

This application is a continuation-in-part of U.S. patent Application Ser. No. 694,126, filed June 8, 1976, now abandoned.

This invention concerns the generation of scanning radio beams. More particularly, it relates to the modulation of microwave signals supplied to sequentially actuated feed elements of aerials to create a scanned beam of radiation in space which, when received by an aircraft, has the characteristics of a continuously scanned radio beam, and/or beam of radiation having specific predetermined characteristics.

In the specification of U.S. Pat. No. 3,878,523, a sequential switching arrangement is described as a result of which a plurality of feed elements of an aerial—typically four elements—are at any time transmitting and the voltage of the signal transmitted by each feed element is modulated in accordance with a cosine pattern.

Recently, work has been carried out to determine what alternative modulation functions may advantageously be used with that and other aerial systems to minimise the aerial dimensions for a given angular width of the scanning beam, or, alternatively, to provide a smaller beamwidth using an aerial of given dimensions.

In broad terms, the complex modulation method of the present invention compensates the residual aberrations which may be present in commutated scanning antennas. This specification also presents a unifying analytical approach by which the method may be applied to different forms of antenna.

SUMMARY OF THE INVENTION

According to the present invention, a method of generating a scanning radio beam using a commutated aerial comprises the sequential excitation, by an r.f. signal, of a group of adjacent feed elements of the aerial through amplitude modulator and phase modulator pairs, the amplitude modulator and phase modulator pairs effecting complex modulation of the r.f. signal in accordance with a predetermined function, one period of the predetermined function being obtained by the steps of:

(i) specifying a required far field composite beam pattern, f(θ), produced by the excited group of feed elements, and computing its Fourier transform F(x), (ii) obtaining the far field pattern, e(θ), produced by a single excited feed element, and computing the Fourier transform thereof, E(x), (iii) computing the function M(x), given by $$M(x)=F(x)/E(x),$$

(iv) performing an inverse Fourier transformation on M(x) to obtain the continuous feed excitation function m(θ), (v) sampling m(θ) at intervals $\theta_s$ corresponding to the feed element spacing in order to determine the relative excitation of each feed element in the excited group, (vi) truncating the function m(θ) to an interval corresponding to the number of instantaneously excited feed elements, and (vii) selecting a feed element spacing small enough and a truncation interval large enough to ensure that negligible deterioration of f(θ) occurs.

The complex modulation pattern is applied to the feed elements at a repetition rate dependent on the rate of scan of the scanning beam as noted above.

In carrying out step (ii) of the determination of the predetermined function, the far field pattern e(θ), can be obtained either by computation or by measurement. And in the case of lens fed arrays, it may be more convenient, in a given situation, to determine E(x) directly by computation or by measuring the amplitude and phase distribution at the lens output. In this last case, e(θ) can be obtained, if desired, by Fourier transformation of the directly determined E(x).

Also according to the present invention, apparatus for use in generating a scanning radio beam with a commutated aerial comprises: a plurality of amplitude modulators and a plurality of phase modulators, each amplitude modulator being connected in series with a respective phase modulator; an r.f. power generator connected to supply an r.f. signal to each amplitude modulator and phase modulator pair; and means connected to each said amplitude modulator and phase modulator pair to effect complex modulation of the r.f. signal sequentially applied to a group of adjacent feed elements of the aerial in accordance with a predetermined function.

Preferably, the predetermined function is obtained by the steps of:

(i) specifying a required far field composite beam pattern, f(θ), produced by the excited group of feed elements, and computing its Fourier transform F(x), (ii) obtaining the far field pattern, e(θ), produced by a single excited feed element, and computing the Fourier transform thereof, E(x), (iii) computing the function M(x), given by $$M(x)=F(x)/E(x),$$

(iv) performing an inverse Fourier transformation on M(x) to obtain the continuous feed excitation function m(θ), (v) sampling m(θ) at intervals corresponding to the feed element spacing in order to determine the relative excitation of each feed element in the excited group, (vi) truncating the function m(θ) to an interval corresponding to the number of instantaneously excited feed elements, and (vii) selecting a feed element spacing small enough and a truncation interval large enough to ensure that negligible deterioration of f(θ) occurs.

The alternatives recited above are, of course, available in this determination of the predetermined function.

The truncated version of m(θ) then determines the modulation envelope of the r.f. power which is applied to each feed element. For a chosen angular velocity of the scanning beam, time is proportional to θ/Ω. Quasi-continuous motion of the beam is achieved by energising successive feed elements with a time delay $\theta_s/\Omega$.

The present invention will be more clearly understood from the following description of embodiments of it.

BRIEF DESCRIPTION OF THE DRAWINGS

In this description, reference will be made to the accompanying drawings, in which.

DESCRIPTION OF EMBODIMENTS OF THE INVENTION

It will be appreciated by those skilled in this art that with each aerial system illustrated in FIGS. 1 to 4, the excitation of a particular feed element P should ideally produce a plane wavefront in the radiating aperture; that is, one whose phase is constant across a reference plane normal to the direction of peak radiated energy. However, in practice, the aerials of FIGS. 1, 2 and 3 exhibit phase errors of a generally symmetrical shape, as sketched in those figures. The result of this is that the beam pattern exhibits rather large symmetrical sidelobes. Furthermore, in the most compact antenna designs, the aperture illumination function may be scanned close enough to the aperture edge for truncation of the illumination function to occur on one side, thus giving rise to beam broadening and a further increase in sidelobe height. Lenses of the type used with the embodiment featured in FIG. 4 have a general property of low aberration in certain preferred directions but generally anti-symmetrical aberration, predominantly cubic, in other directions. Such aberration gives rise to an unsymmetrical beam pattern with a high sidelobe on one side (a coma lobe).

The consequence of the presence of aberration in the lens-fed arrays is that, to generate narrow beams scanned over wide coverage angles, it is often found that an impractically large lens must be used if the aberrations are to be kept small enough to permit use of a simple commutation system with real or constant-phase modulation. Accordingly, the present invention proposes, for the first time, the application of complex modulation to the feed system, thus offering the possibility of substantial size reduction of the collimating lens. Likewise, complex modulation of the feed system of a torus antenna enables a substantial reduction of the size of an antenna radiating a given beam width. For each example of aerial system, the present invention aims to excite a small group of adjacent feeds with a travelling excitation function which is modulated in such a way as to cancel the aberration as far as possible in order to reduce the sidelobes. If necessary, the form of the excitation may be varied as the scan proceeds, in cases where either the aberration or the aperture distribution is a function of scan angle.

Figure 1:
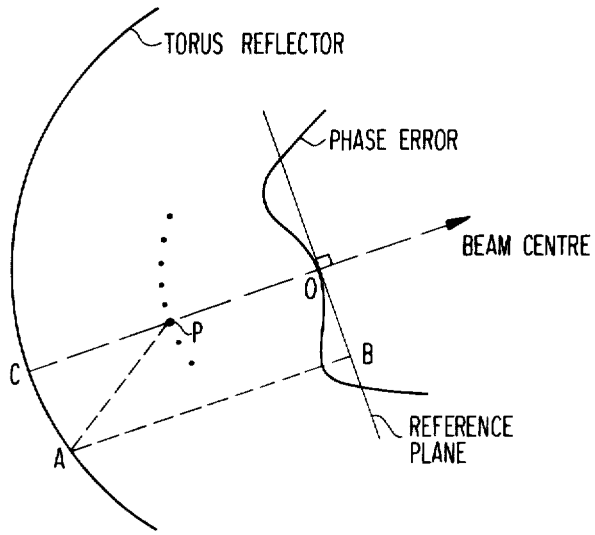
FIG. 1 is a schematic representation of a planar beam "torus" antenna system of the type described in aforementioned U.S. Pat. No. 3,878,523.
Figure 2:
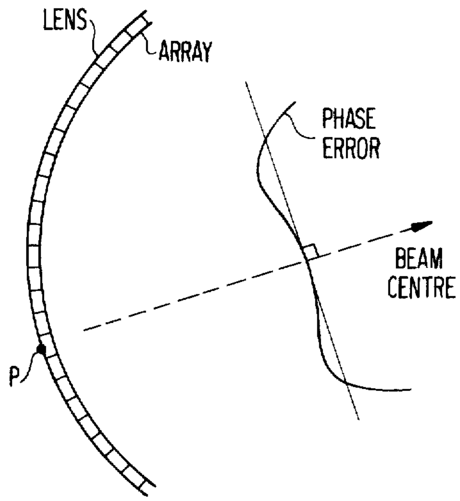
FIG. 2 is a schematic plan of an upright cylindrical array which can radiate a planar beam from its concave surface in a manner exemplified by FIG. 1 of the specification of U.S. patent application Ser. No. 594,126, filed June, 8, 1976.
Figure 3:
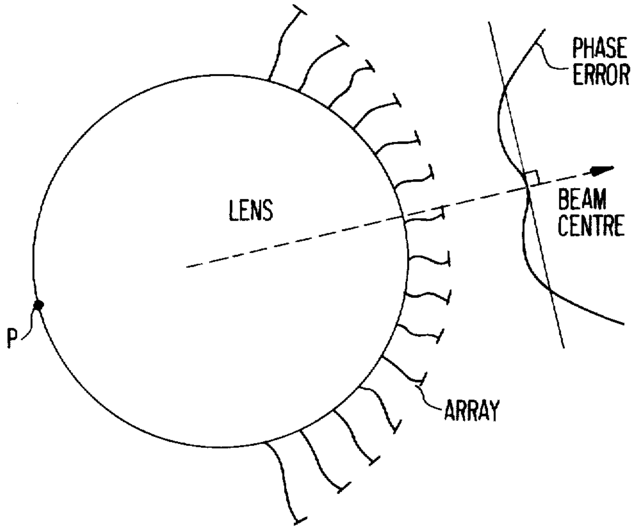
FIG. 3 depicts a cylindrical array radiating a planar beam from its convex surface in a manner exemplified by FIG. 2 of the specification of aforementioned U.S. patent application No. 694,126 or FIG. 2 of the specification of U.S. patent application Ser. No. 745,701, filed Nov. 29, 1976, now U.S. Pat. No. 4,146,895.
Figure 4:
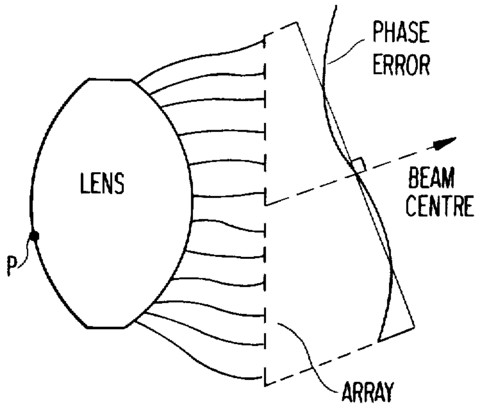
FIG. 4 shows a linear array radiating a conical beam which is collimated by a lens such as a Rotman lens or the geodesic lens described in the specification of U.S. patent application Ser. No. 753,383, now U.S. Pat. No. 4,114,162, filed Dec. 22, 1976 (the Rotman lens is described in the paper by W. Rotman and R. F. Turner, entitled "Wide-angle microwave lens for line source application" in IEEE Transactions on Antennas and Propagation, AP11, page 623, 1963)
Figure 5:
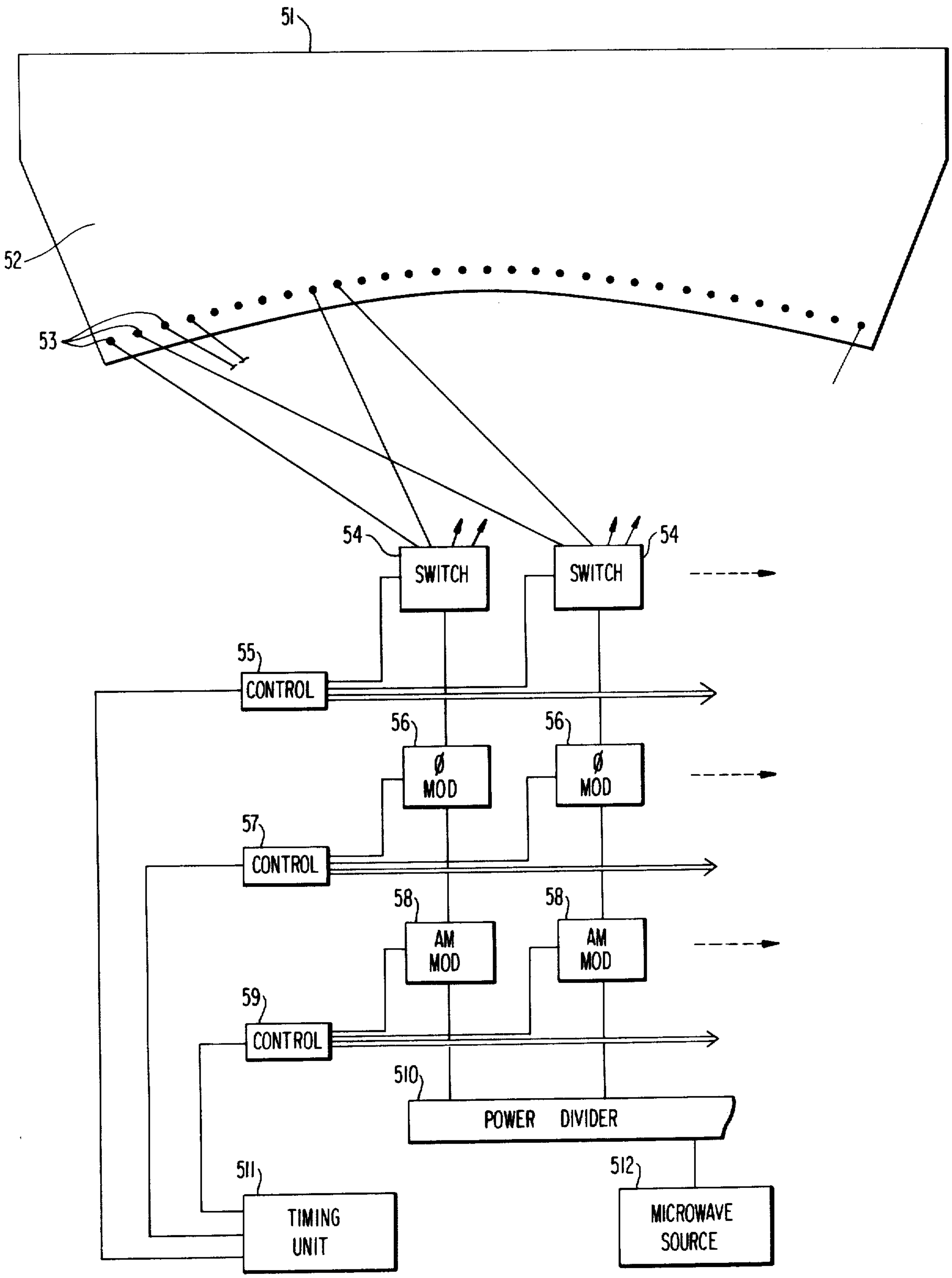
FIG. 5 is a schematic representation of the hardware of the present invention, connected to the feed elements of a commutatively operated antenna.

FIG. 5 shows in schematic form the hardware of the present invention, connected to the feed elements of a commutated aerial. The radiating aperture 51 is connected to the feed elements 53 by the collimating device 52. Switches 54, having two or more outlets, distribute power from the microwave source 512 via the power divider 510, amplitude modulators 58 and phase modulators 56 to the feed elements 53. For an N-phase modulator there are N amplitude and phase modulators and the power divided provides N outputs of equal power. The left-hand switch 54 distributes power in sequence to feed elements 1, N+1, 2N+1, . . . (see the waveforms of FIG. 9). The next switch distributes power to feed elements 2, N+2, 2N+2, . . . and so on. Where the number of feed elements is larger than can be accommodated by a single row of switches it will be clear to those skilled in the art that additional rows of switches can be inserted below the row shown in FIG. 5 to build up a tree network of unlimited distribution capacity. Control of the modulators and switches may be effected by a timing unit 511 which delivers timing pulses to the control devices 55, 57 and 59, each containing programmable read-only memories (PROM's) which generate control waveforms for the switches and modulators in an overlapping sequence to be described later.

In an embodiment built for a torus antenna in accordance with the design procedures of the following sections, 32 feed elements were used and an eight phase modulator (N=8) was adopted. The switches 54 comprised eight single-pole four-throw microwave switches, Arra model 4-8753D. The phase modulators 56 comprised eight digital phase shifters, Microwave Associates model 8351-4CD. The amplitude modulators 58 comprised eight Hewlett Packard modulators model 8733A, and the eight-way power divider 511 was a stripline device built in-house in a manner which will be familiar to those skilled in the art. The power source 512 was a California Microwave oscillator model PE53NL-1 locked to a frequency of 5060 MHz.

The timing unit 511 and the control devices 55, 57 and 59 were built in-house from standard digital integrated circuits in a manner which will be familiar to logic circuit designers; such devices may be implemented in many different ways according to individual designer preferences. In the embodiment constructed, the amplitude control waveforms were stored in a set of National Semiconductor model 5203 PROM's which controlled the modulators 58 through digital to analogue converters. This allowed the amplitude waveform, shown later in FIG. 10, to be digitized in 128 discrete levels. The phase modulation waveform, also shown in FIG. 10, was digitized to the nearest 22.5° increment in accordance with the capability of the 4-bit phase shifters 56. The 22.5° phase resolution was found to be adequate, taking into account the filtering which was used in the receiver which processed the scanning beam generated by the torus. If finer phase steps had been required, 6-bit phase shifters or an analogue type would have been used.

Figure 6:
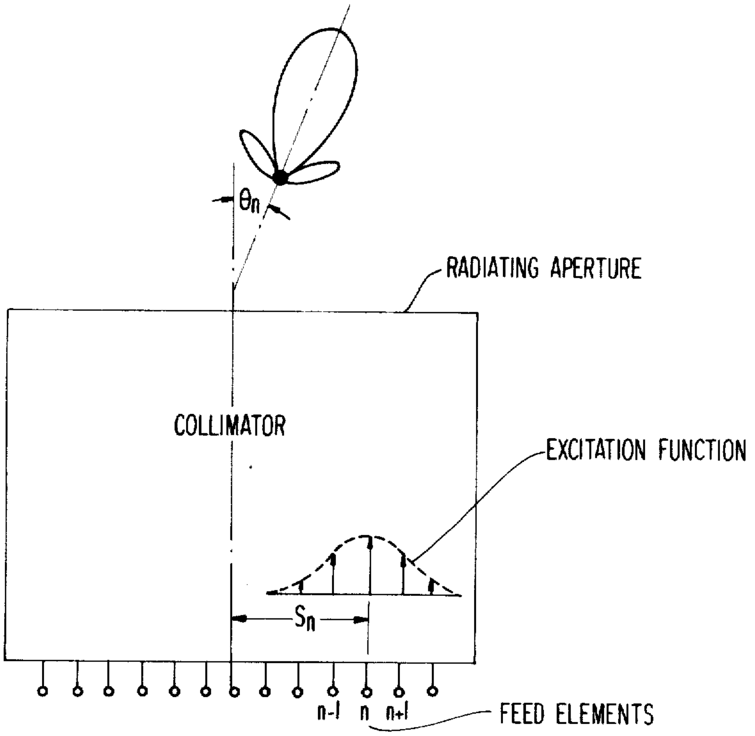
FIG. 6 is a highly schematic representation of an aerial, which depicts a general instantaneous operating condition for use in theoretical considerations; and FIGS. ***7a–d*, *8a–k*, 9, and *10a–b*** are graphical representations of information provided in the ensuing description.

In FIG. 6 the collimation system is drawn schematically, with an inset showing the relative excitation of a group of adjacent feed elements at some instant of time. The excitation values are contained within an envelope which may be visualized as a travelling excitation function. Also shown in FIG. 6 is a representation of the elementary beam pattern which is produced by exciting a single feed element. Thus, exciting the nth feed element at a distance $S_n$ measured along the feed arc from the central axis of the collimation system produces a beam displaced by an angle $\theta_n$ from that produced by a central feed element. Usually the feed elements will be spaced to give equiangular beam spacings, but in the conical beam antenna of FIG. 4 it may be convenient to make sin $\theta_n$ proportional to n, since for such antennas the beamwidth is constant in sin $\theta$ units.

Figure 7A:
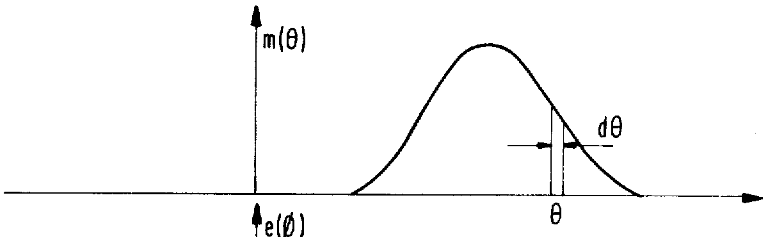
Figure 7B:
Figure 7C:
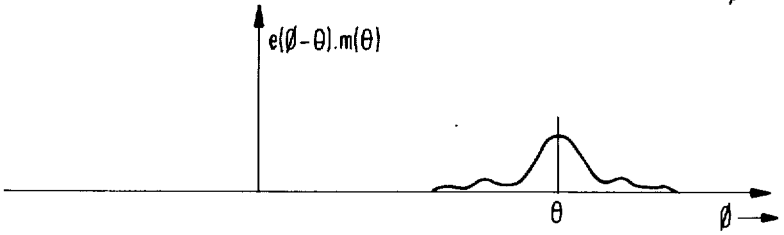
Figure 7D:
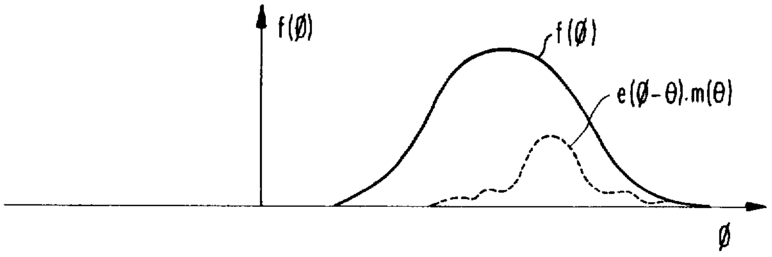

In the following analysis it is assumed that the elementary beams are equally-spaced in $\theta$ units, but the analysis may be readily extended to cover the case of equal spacing in sin $\theta$ units. It is also convenient to commence with a hypothetical arrangement in which the feed elements are sufficiently densely packed and the number of excited feed elements sufficiently numerous as to approximate a continuous distribution of excitation. Knowing the correspondence between the position of a feed element and the direction of its associated elementary beam it is convenient to plot the excitation as a function of $\theta$ rather than s. The excitation is shown as the function m($\theta$) in FIG. 7*a*. The localised excitation at any point will produce an elementary beam of shape depicted by the function e($\phi$) in FIG. 7*b*, where e($\phi$) exhibits the sidelobe structure appropriate to the particular aberration present in the antenna. For local excitation corresponding to the angle $\theta$ the resulting elementary beam has a maximum amplitude proportional to m($\theta$) and is displaced by an angle $\theta$ as shown in FIG. 7*c*. Thus the elementary contribution to the composite beam pattern f($\phi$) plotted in FIG. 7*d*, due to excitation between angles $\theta$ and $\theta+d\theta$, is given by $df(\phi)=e(\phi-\theta)\,m(\theta)d\theta$. The composite beam pattern is therefore described by $$f(\phi) = \int_{\theta_1}^{\theta_2} e(\phi-\theta)\, m(\theta)d\theta \quad (1)$$

where the limits $\theta_1$ and $\theta_2$ correspond to points of negligible excitation on the feed arc and can be replaced by $\pm\infty$ for analytical purposes.

Equation (1) will be recognised as the convolution of the two functions e($\theta$) and m($\theta$) and may be manipulated by standard Fourier theory (see, for example, R. N. Bracewell's book "The Fourier Transform and its Applications," McGraw Hill, 1965). Thus if F(x), E(x), and M(x) are, respectively, the Fourier transforms of f($\theta$), e($\theta$) and m($\theta$), that is $$F(x) = \int_{-\infty}^{\infty} f(\theta)e^{-2\pi ix\theta}d\theta \text{ etc.,}$$

then, by the convolution theorem, $$F(x)=E(x)\cdot M(x) \quad (2)$$

and therefore $$M(x)=F(x)/E(x) \quad (3)$$

Thus if f($\theta$) is desired to have a specified shape and the shape of the elemental pattern e($\theta$) is known, it is possible to compute M(x) from equation (3) and arrive at the required excitation function m($\theta$) by performing the inverse Fourier transformation, giving:

$$m(\theta) = \int_{-\infty}^{\infty} M(x)e^{2\pi ix\theta}dx \quad (4)$$

In the above equation if $\theta$ is expressed in angle units, the variable x may be expressed in reciprocal angle units. However, as shown in page 279 of Bracewell's book, the usual Fourier transform pairs adopted in antenna problems are radiation patterns in sin $\theta$ space and aperture functions using an aperture coordinate x measured in wavelengths. For the purpose of the present analysis, where the convolution of equation (1) is performed over a small angular range, it is permissible to shift the $\theta$ origin to be centered on the region of interest and to regard $\theta$, measured in radians, as equivalent to sin $\theta$. The functions F(x), E(x), and M(x) in equations (2) and (3) may then be regarded as aperture functions with x representing a distance in wavelengths measured across the radiating aperture in a direction normal to the direction of the instantaneous beam centre. For the antenna of FIG. 4, using beams equispaced in sin $\theta$ units, it is logical to retain the direction normal to the array as an angle origin and to recast equation (1) in sin $\theta$ units.

The foregoing treatment has used two-dimensional antenna theory. Where in practice the antenna properties vary with a third dimension, for example with elevation in an azimuth scanner, it will be usual to optimize the system at some preferred elevation and accept some variation in performance at other elevations.

After computing the continuous excitation function, sampling theory must next be invoked to determine how widely the discrete feed elements can be spaced while still achieving results equivalent to continuous excitation. Finally, the effect of truncating the excitation function (that is, minimising the number of feed elements which are excited at any one time) must be determined in order to arrive at an economic design for the excitation apparatus.

In the above treatment it has also been tacitly assumed that the elementary pattern e($\theta$) does not change its shape significantly between the limits $\theta_1$ and $\theta_2$, an assumption which is reasonable for the narrow-beam systems to which the present technique will normally be applied. However, as foreshadowed earlier it is permissible to gradually change the shape of m($\theta$) to cope with changing aberration as the scan moves across the feed arc.

By way of example, the application of the method to aberration correction in a torus antenna will now be detailed with reference to FIG. 8. The desired form of corrected beam pattern f($\theta$) (FIG. 8*a*) may be one corresponding, say, to a cosine distribution of aperture field (see H. Jasik's "Antenna Engineering Handbook," McGraw Hill, 1961, at page 2-26), that is, $F(x)$=cos $\pi \cdot x/d$ (FIG. 8*b*) where $|x| \leqq d/2$, and d is the aperture width required to achieve the specified beam pattern. Such a cosine distribution will result in a radiation pattern described by $$f(\theta) = \left(\frac{\pi}{2}\right)^2 \cos u / \left\{\left(\frac{\pi}{2}\right)^2 - u^2\right\}$$

where $u = \pi d/\lambda \cdot \sin\theta$

Here $f(\theta)$ has a first sidelobe 23 db below the beam maximum.

For a torus antenna, the practical usable value of d has been found by experience to be about 90% of the torus radius. Over the inner region of the torus defined by such a value of d, the aberration, while substantial, is amenable to correction.

In the case of the torus it has been found convenient to use reflector theory, such as that described by S. Silver in Chapter 5 of "Microwave Antenna Theory and Design" (McGraw Hill, 1949) to compute $e(\theta)$ from the currents induced on the reflector by the radiation from a single feed element. The phase term implicit in such a far-field formulation exhibits the aberration to be expected from a cylindrical (torus) antenna and corresponds to the differential pathlength PAB-PCO in FIG. 1, where the reference plane OB is normal to the central ray PCO. Putting OB=x the differential phase $\phi(x)$ is readily computed to be $$\phi(x) = \frac{2\pi R}{\lambda}\left\{\sqrt{1 + \alpha^2 - 2\alpha\sqrt{1-(x/R)^2}} + \sqrt{1-(x/R)^2} + \alpha - 2\right\}$$

where

R=reflector radius $\lambda$=operating wavelength $\alpha$=radius of feed arc/radius of reflector The parameter $\alpha$ is subject to experimental adjustment but is usually found to have an optimum value in the range $\alpha=0.51$ to 0.52. Here the feed setting is just inside the so-called paraxial focus for which $\alpha=0.5$. The elementary pattern computed in this way has a shape depicted as $e(\theta)$ in FIG. 8*c* and in general will have large sidelobes and a complex phase pattern. It is now convenient to Fourier-transfer $e(\theta)$ numerically to obtain the effective aperture function E(x), which, as expected, has a phase curve corresponding to equation (5) and a broad amplitude pattern with no simple functional dependence on x but generally as depicted in FIG. 8*d*.

Figures 8A, 8B, 8C, 8D, 8E, 8F, 8G, 8H, 8I, 8J, 8K:
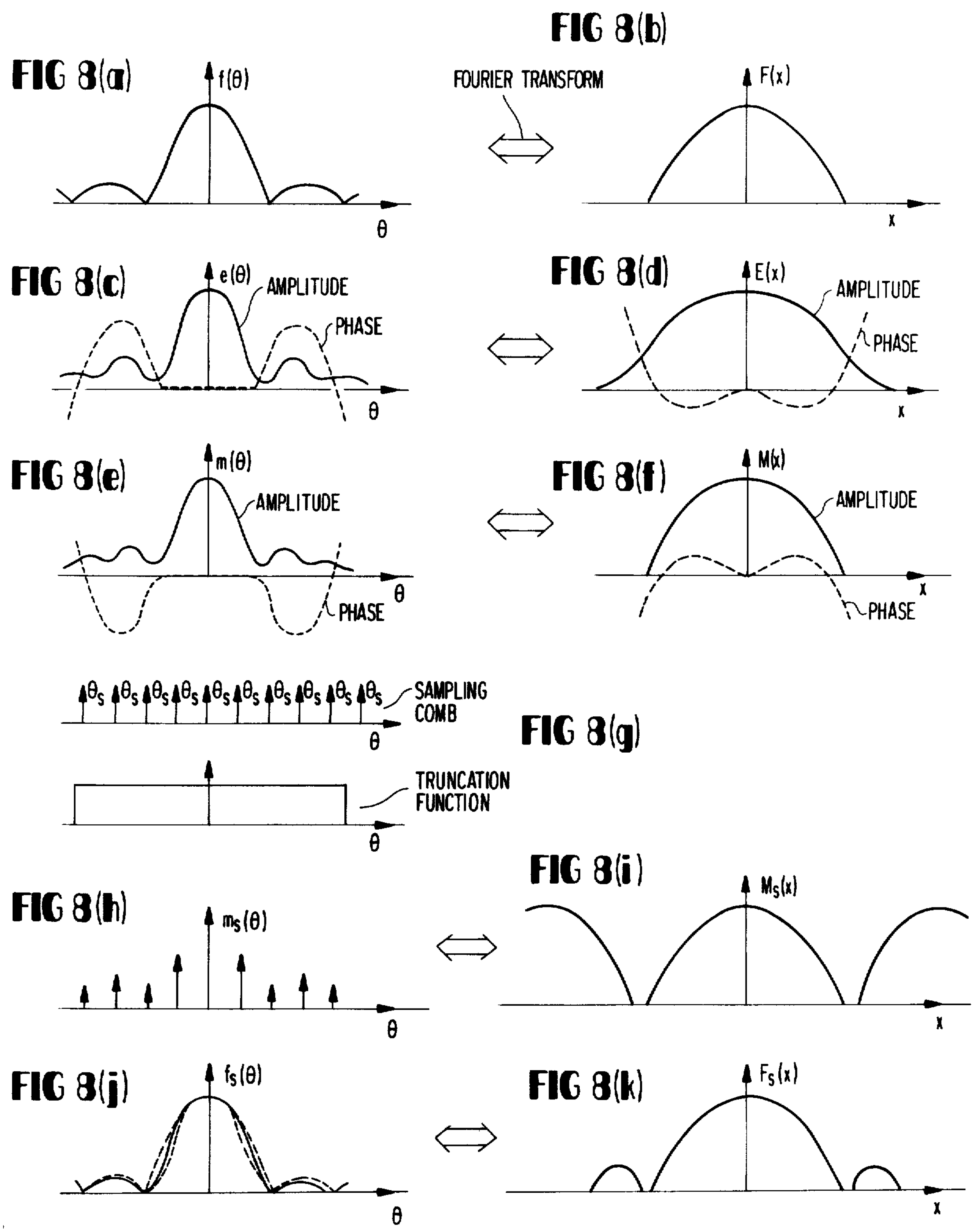

Computing the quotient $M(x)=F(x)/E(x)$ leads to an M(x) in the form depicted in FIG. 8*f* which has conjugate phase to E(x). Fourier transformation of M(x) gives the desired continuous feed excitation function $m(\theta)$ (FIG. 8*e*) which generally speaking is similar in shape to $e(\theta)$ and with approximately conjugate phase.

When discrete feed elements are used, the effect is equivalent to multiplying $m(\theta)$ by a sampling comb with sample spacing $\theta_s$, the chosen feed spacing, followed by truncation with a rectangle function of length corresponding to the number of excited feeds (FIG. 3*g*). This produces the sampled function $m_s(\theta)$ in FIG. 8*h*, where the phase (not shown) corresponds to that of $m(\theta)$ at the sampling points. The effect of sampling $m(\theta)$ is to replicate its transform at intervals $\lambda/\theta_s$ and depicted by $M_s(x)$ of FIG. 8*i*, while the truncation function has a slight rippling effect on $M_s(x)$.

The product $M_s(x) \cdot E(x) = F_s(x)$ now exhibits small replication lobes as depicted in FIG. 8*k*. When the excitation function is moved across the sampling comb corresponding to scanning the antenna by sequential modulation and commutation of the feed power, the phase of the replication lobes of $F_s(x)$ varies continuously relative to that of the main lobe and the effect on the final synthesised beam pattern $f_s(\theta)$ is to produce a certain amount of beamwidth modulation and velocity modulation of the beam motion as indicated by the dotted lines in FIG. 8*j*. Such effects may be kept within permissible limits if the beam spacing $\theta s$ is made small enough for the replication sidelobes of $M_s(x)$ to encroach only slightly on the wings of E(x). Usually it is found that a beam spacing $\theta s$ not greater than 85% of the desired effective beamwidth will satisfy this requirement. Truncating the number of excited feed elements to a minimum of six but preferably eight is also acceptable.

Such a degree of truncation of the modulation function retains the features of $m(\theta)$ which have significant amplitude and which are necessary for aberration correction. It may be noted in passing that in simple lens-fed systems, where the lens can be designed for low aberration, the amplitude of $m(\theta)$ is found to be quite small outside its central lobe and the phase is essentially constant within this lobe. A real modulation function without r.f. phase modulation can then be employed, and can be truncated to the point where only four or sometimes three feed elements need to be excited at any one time.

Figure 9:
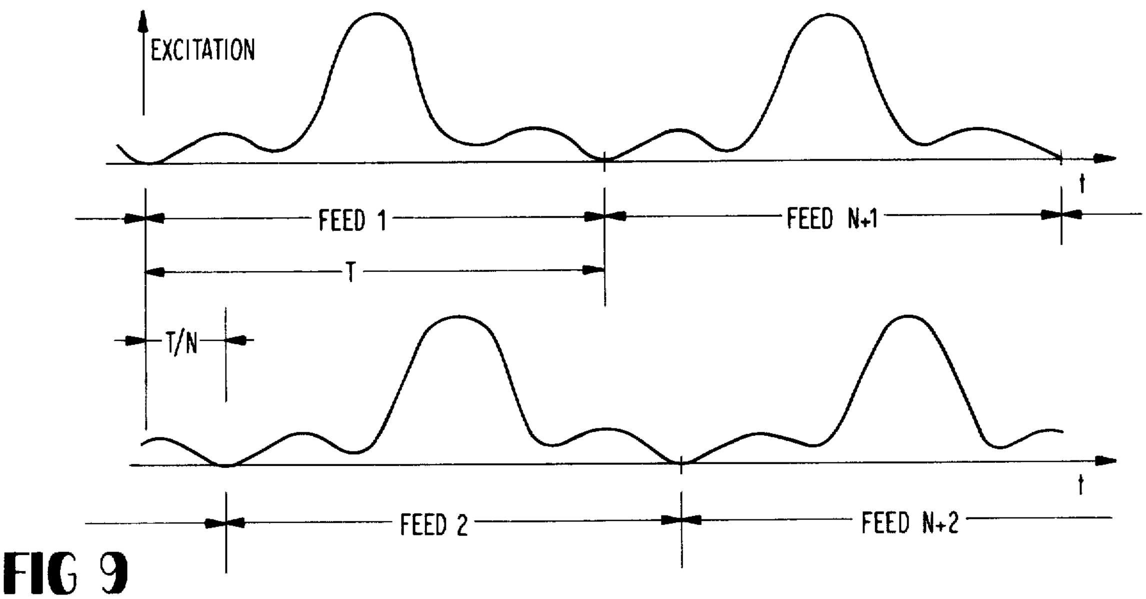
Figure 10A:
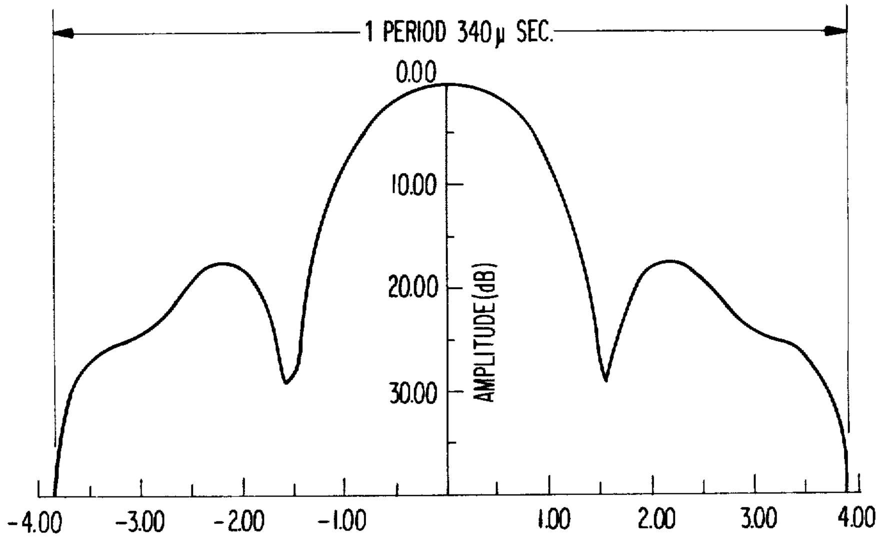
Figure 10B:
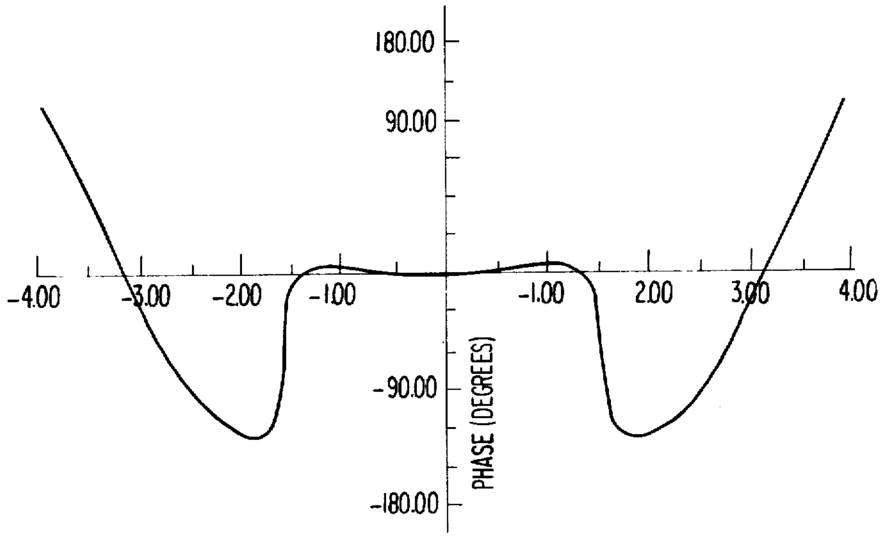

Finally it is noted that the waveform of FIG. 8*e* truncated to the length defined by the truncation function of FIG. 8*g* represents one full cycle of a periodic time waveform which must be generated at the output of each amplitude and phase modulator of FIG. 5, with the further requirement that adjacent modulators must have a relative time shift of their modulation peaks equal to one Nth of a modulation period, as shown in FIG. 9. Here T is the modulation function, N is the number of modulation phases, and $T=N \cdot \theta_s/\Omega$, where $\Omega$ is the chosen angular velocity of scanning. In other words, the time delay between the excitation of adjacent feed elements is $\theta_s/\Omega$. By way of example one period of the amplitude and phase waveform computed for the torus antenna referred to earlier is shown in FIG. 10.

Beam patterns other than the one described above may be synthesised with good accuracy, for example a Taylor pattern described by Jasik (loc.cit) at page 2-27. For the other forms of antenna, depicted in FIGS. 2, 3 and 4, the same computational method is employed, but with the function E(x) determined in magnitude and phase by the measured or calculated amplitude and phase characteristic of the lens in question.

In FIG. 8 it is shown that the beam pattern generated in space is the convolution of the sampled modulation function with the elemental beam pattern. By an analogous argument, it can be shown that the pulse shape observed at a fixed point in space is the convolution of the elemental pattern sampled at spacings of $\theta_s$ with the continuous modulation function. Corresponding to the requirement that the beam in space should have a constant width and move uniformly with time is the requirement that the observed pulse should have a width independent of the observer's position and a time of arrival linearly related to the observer's angular position. These two viewpoints are essentially equivalent and impose identical requirements on the modulation system and the elemental beam spacing.

Those skilled in this art will recognise that the technique described above for determining the form of the excitation function m(θ) required to produce a specified composite beam pattern f(φ) represents, in the case of a torus antenna, an alternative analytical method to that disclosed in the specification of aforementioned U.S. application Ser. No. 694,126, which comprised the steps of:

1. computing the distribution of the currents required around the illuminated portion of the reflector in order to produce a specified beam pattern,
2. computing the amplitude and phase patterns of the image fields that would be created along the feed arc by the conjugate of the computed distribution, and
3. truncating the amplitude and phase patterns over an interval sufficient to enable their use without substantial deterioration of the image fields.

It will be apparent that these three steps, carried through rigorously, lead to the same result as the procedure embodied in FIG. 8 of this specification. However, the previous method requires more electromagnetic computations than the new procedure and is much less flexible for design purposes. For example, the first step of these three requires the determination, from electromagnetic theory, of the reflector current distribution which will produce a satisfactory far-field beam composite pattern f(θ). This is a well-known problem in antenna reflector theory and suitable solutions can be found in the textbooks (see S. Silver, loc. cit, Chapters 5 and 6).

Step 2 then involves the determination of the feed excitation function m(θ) which will radiate directionally towards the reflector and induce the required reflector current distribution. As outlined in step 2, m(θ) may be found by a reciprocal computation in which the reflector current distribution is replaced by its conjugate distribution which will then radiate towards the feed and set up a focused or "image" field along the feed elements. This electromagnetic computation is one which has been studied in the literature of reflector antennas (see, for example, the paper by H. C. Minnett and B. M. Thomas, entitled "Fields in the image space of symmetrical focusing reflectors," in Proc. I.E.E., October 1968). Unless the distance from reflector to feed is large compared with the width of reflector over which the current distribution function extends (in which case, a Fourier transform relation applies between the current distribution function and the feed excitation function), the computation is elaborate but can be handled numerically with a digital computer. The conjugate of the focused field distribution thus determined is the required feed excitation function m(θ).

Step 3 requires the truncation of the excitation function m(θ) to correspond to a finite length of feed arc occupied by an excited group of elements. Since the amplitude of the excitation function decreases rapidly with θ, the excitation level at the truncation limits can be made small enough, even for a moderate number of excited feed elements, for the truncation to have a negligible effect on performance.

The new computational procedure, illustrated in FIG. 8 of the present specification, involves only one electromagnetic problem, namely the determination of the far-field pattern e(φ) produced by a single feed element. Thereafter the designer can manipulate the equations given above to obtain the excitation function m(θ) required to produce any specified composite beam pattern. Thus although the alternative computational procedures provide equivalent solutions, those skilled in the art will readily recognize the practical superiority of the presently described procedure for using the hardware of FIG. 5.

What we claim is:

1. Apparatus for use in generating a scanning radio beam with a commutated aerial comprising: a plurality of amplitude modulators and a plurality of phase modulators, each amplitude modulator being connected in series with a respective phase modulator; an r.f. power generator connected to supply an r.f. signal to each amplitude modulator and phase modulator pair; and control means connected to each said amplitude modulator and phase modulator pair to effect complex modulation of the r.f. signal sequentially applied to a group of adjacent feed elements of the aerial in accordance with a predetermined function, wherein said control means comprises a timing unit for generating timing pulses and first and second control devices responsive to said timing pulses for respectively controlling said amplitude modulators and said phase modulators, said first and second control devices each having programmable ready-only memories which are programmed in accordance with said predetermined function to generate control waveforms for said amplitude modulators and said phase modulators in an overlapping sequence, said predetermined function being obtained by the steps of:

(i) specifying a required far field composite beam pattern, f(θ), produced by the excited group of feed elements, and computing its Fourier transform F(x), (ii) obtaining the far field pattern, e(θ), produced by a single excited feed element, and computing the Fourier transform thereof, E(x), (iii) computing the function M(x), given by $$M(x)=F(x)/E(x)$$

(iv) performing an inverse Fourier transformation on M(x) to obtain the continuous feed excitation function m(θ), (v) sampling m(θ) at intervals corresponding to the feed element spacing in order to determine the relative excitation of each feed element in the excited group, (vi) truncating the function m(θ) to an interval corresponding to the number of instantaneously excited feed elements, and (vii) selecting a feed element spacing small enough and a truncation interval large enough to ensure that negligible deterioration of f(θ) occurs.

2. Apparatus as defined in claim 1, in which the determination of the far field pattern, e(θ) is obtained by computation.

3. Apparatus as defined in claim 1, in which E(x) is determined by computation and e(θ) is obtained by Fourier transformation of E(x).

4. A method of generating a scanning radio beam using a commutated aerial comprising the sequential excitation, by an r.f. signal, of a group of adjacent feed elements of the aerial through amplitude modulator and phase modulator pairs, the amplitude modulator and phase modulator pairs effecting complex modulation of the r.f. signal in accordance with a predetermined function, one period of the predetermined function being obtained by the steps of:

(i) specifying a required far field composite beam pattern f(θ), produced by the excited group of feed elements, and computing its Fourier transform F(x), (ii) obtaining the far field pattern, e(θ), produced by a single excited feed element, and computing the Fourier transform thereof, E(x), (iii) computing the function M(x), given by $$M(x)=F(x)/E(x),$$

(iv) performing an inverse Fourier transformation on M(x) to obtain the continuous feed excitation function m(θ), (v) sampling m(θ) at intervals $\theta_s$ corresponding to the feed element spacing in order to determine the relative excitation of each feed element in the excited group, (vi) truncating the function m(θ) to an interval corresponding to the number of instantaneously excited feed elements, and (vii) selecting a feed element spacing small enough and a truncation interval large enough to ensure that negligible deterioration of f(θ) occurs.

5. A method as defined in claim 4, in which the determination of the far field pattern, e(θ) is obtained by computation.

6. A method as defined in claim 4, in which E(x) is determined by computation and e(θ) is obtained by Fourier transformation of E(x).

7. A method as defined in claim 4, in which the predetermined function is a function of the scan angle of the radio beam.

* * * * *